Patented June 24, 1930

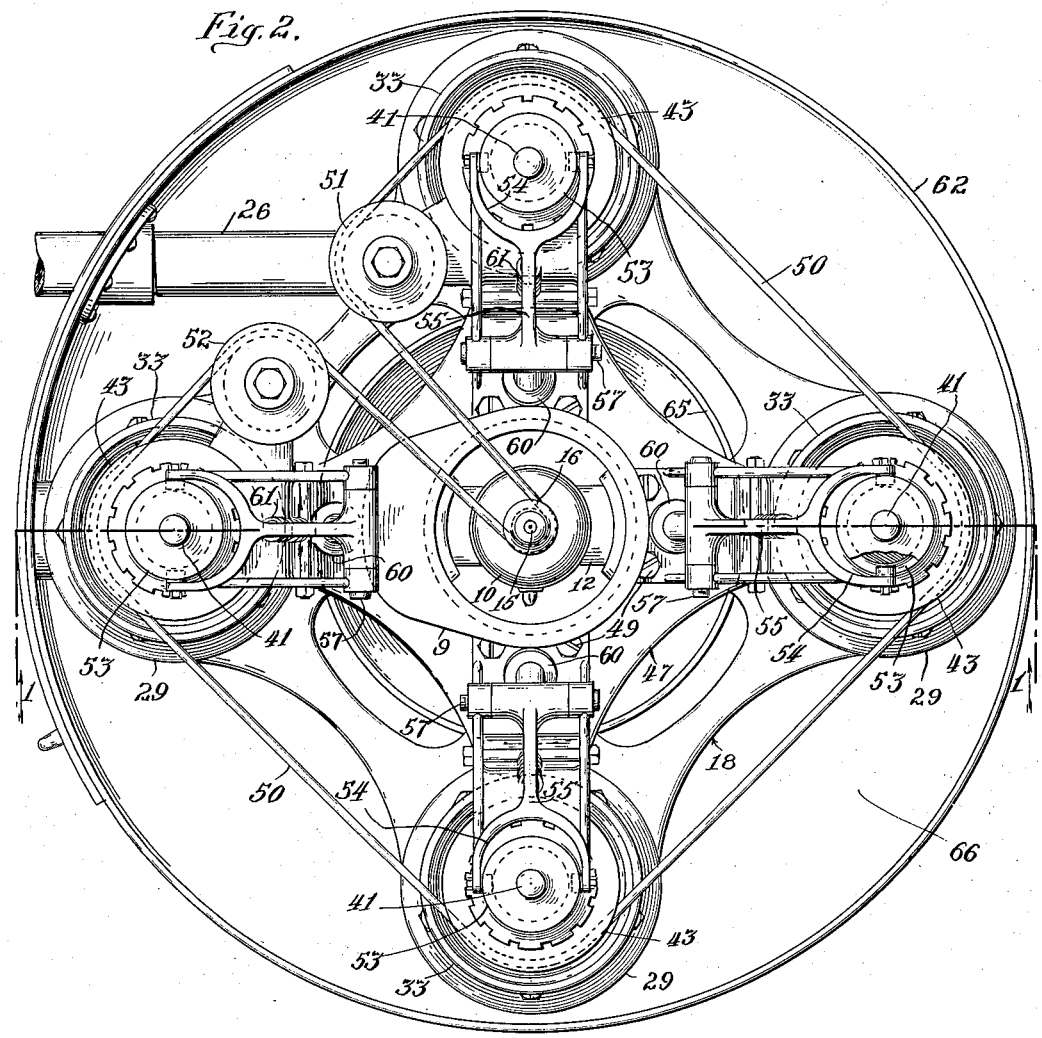
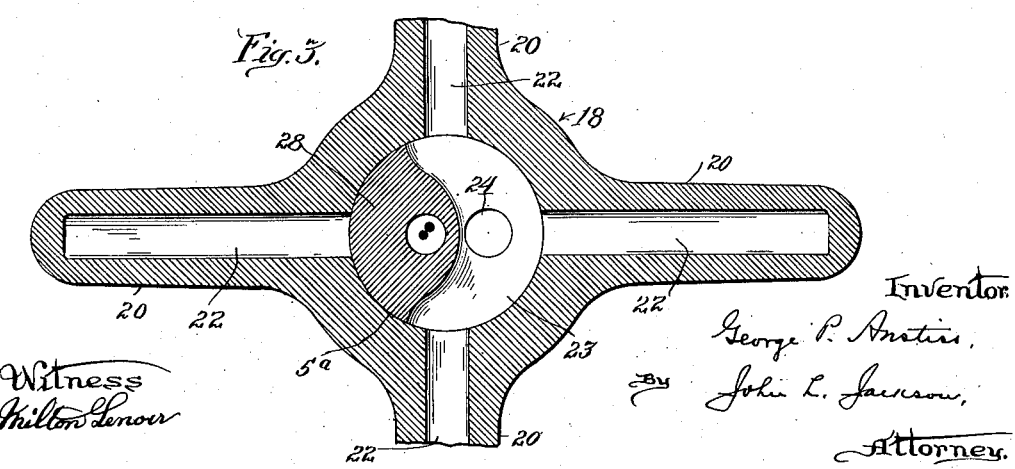

1,766,208

UNITED STATES PATENT OFFICE

GEORGE P. ANSTISS, OF OAK PARK, ILLINOIS, ASSIGNOR TO G. S. BLAKESLEE & CO., OF CICERO, ILLINOIS, A CORPORATION OF ILLINOIS

APPARATUS FOR WASHING ANTIFRICTION BEARINGS

Application filed May 2, 1925. Serial No. 27,420.

My invention relates to the cleansing of anti-friction bearings after they have been assembled, for the removal of grit and other foreign matter that might damage the bearings in use or interfere with their proper operation. As is well understood by those familiar with the art, large quantities of unitary anti-friction bearings are manufactured comprising two concentric hardened rings or raceways, between which balls or rollers are mounted to run, the whole forming a unit which may be applied to automobile wheels or other devices where such bearings are required or desirable. After the parts of the bearing have been assembled, the balls or rollers and the surfaces against which they bear are comparatively inaccessible, so that it is a difficult matter to clean them thoroughly for the removal of any foreign matter that would tend to damage the bearings or interfere with the freedom of rotation of the inner collar, and, so far as I am aware, no one has heretofore devised a satisfactory method of cleaning them thoroughly, or an apparatus that could be successfully used for that purpose. To supply this want is the object of my invention, which object I accomplish as hereinafter described and as illustrated in the drawings. What I regard as new is set forth in the claims.

In the accompanying drawings,—

Fig. 2 is a plan view thereof; and

Fig. 3 is an enlarged detail, being a partial horizontal section on line 3—3 of Fig. 1.

Figure 1:
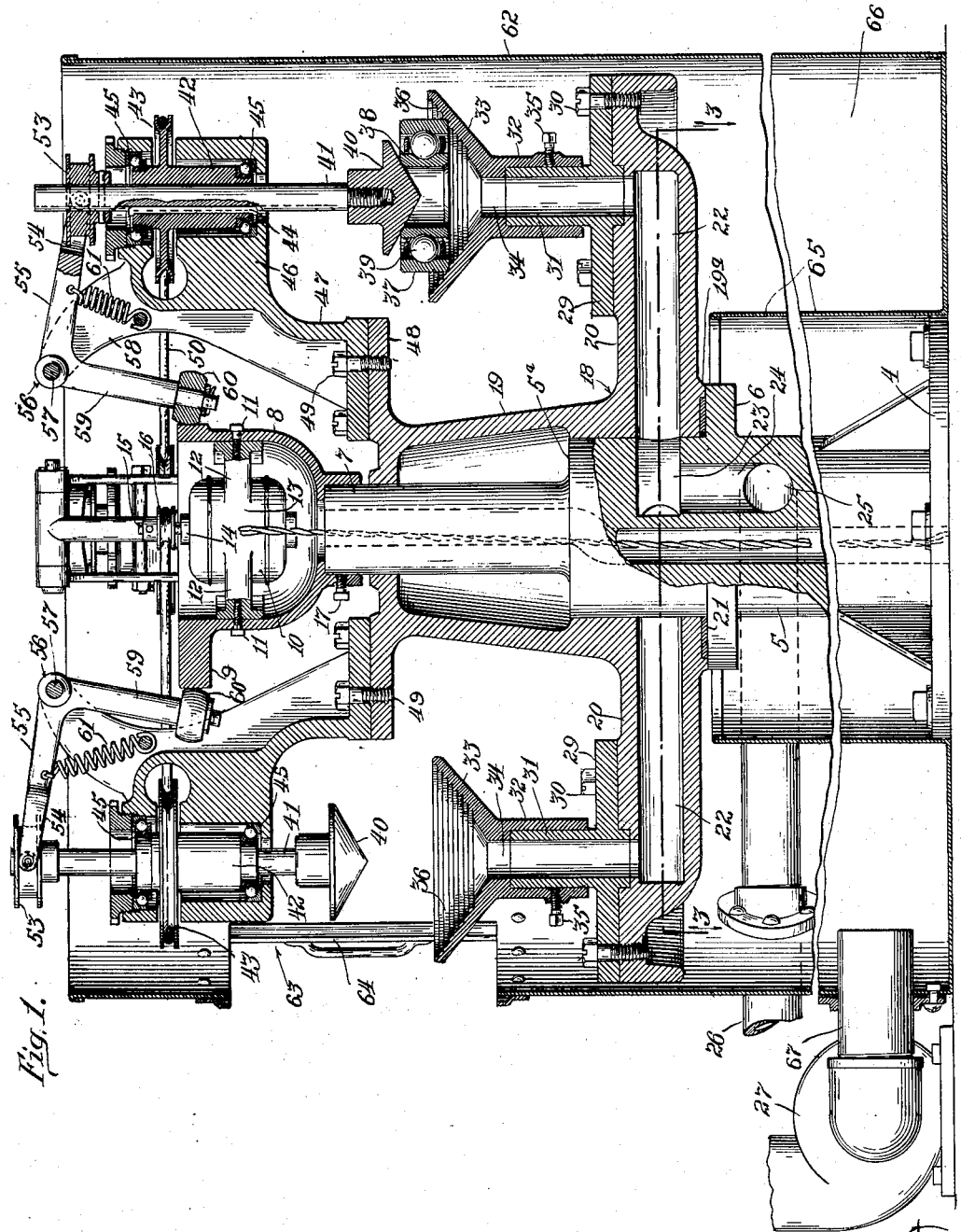
Fig. 1 is substantially a central vertical section on line 1—1 of Fig. 2 illustrating my improved apparatus, some parts being shown in elevation.

I have discovered that anti-friction bearings may be very successfully cleansed by a washing operation consisting in subjecting them to the action of a volume of water forced through them under pressure, meanwhile rotating one of the raceways relatively to the other, and of course incidentally rotating the balls or rollers between said raceways, and this constitutes my improved method, which may be practiced by the use of any suitable apparatus. In the drawings, however, I have illustrated a form of apparatus which is designed especially to practice such method in cleansing such bearings expeditiously, and which will meet the requirements of factories where such bearings are produced in large quantities.

Generally speaking, such apparatus, in the embodiment thereof illustrated, comprises a rotary support or turntable carrying a series of heads, each of which is adapted to support a ball bearing, such heads preferably being so designed that they will support ball bearings of a variety of sizes. The several heads are hollow, and provision is made for supplying them with water under pressure which is forced upwardly through the bearings on the heads. Associated with each head is a chuck which may be moved into engagement with the inner collar of the bearing to hold it firmly on the head, and at the same time rotate the inner collar. The several chucks are arranged to be rotated on their individual axis by power provided from any suitable source, such as an electric motor, and the turntable, together with the chucks, are rotatable about the turntable axis to bring each of the heads successively into a position where the operator may conveniently apply the bearings to the heads or remove them therefrom after they have been washed. In connection with the turntable, valve mechanism is provided which automatically admits water under pressure to the several heads after they move away from the operator's position, and cuts off the water after the washing of any given bearing has been completed and shortly before it returns to the operator's position.

Referring now to the drawings for a more detailed description of the apparatus therein illustrated, — 4 indicates a base plate, from which rises a circular standard 5 provided intermediately with a horizontally disposed annular flange 6. The standard 5 is extended upward beyond the flange 6, as shown at 5ª in Fig. 1, to form a journal at the lower portion of the turntable hereinafter described. Above the portion 5ª said standard is reduced in diameter to form a spindle 7 which not only provides a further support for said turntable, but also has mounted thereon a stationary head 8 which preferably has formed integral therewith a circular horizontally disposed cam 9. The head 8 is bowl or cup-shaped, and within it is mounted an electric motor 10, preferably held in place by screws 11 which engage arms 12 that radiate from a spider bracket 13 in which the motor 10 is mounted. As shown in Figs. 1 and 2, said motor is arranged so that its armature 14 rotates about a vertical axis, the armature shaft 15 being provided with a pulley 16 at a point above the motor. The head 8 is preferably secured on the spindle 7 by a set screw 17.

Mounted to rotate on the journal 5$^a$, and having a bearing at the upper end portion of the spindle 7, is a turntable 18 comprising a hub portion 19 and radiating arms 20, said arms extending horizontally from the hub portion 19. In the machine illustrated there are four of such arms, but the number may be greater or less, as desired. The lower end of the hub 19 extends slightly below the lower surface of the arms 20, as shown at 19$^a$ in Fig. 1, and rests on the upper surface of the flange 6, anti-friction material 21 being preferably introduced between said parts. The arms 20 are provided with water passages 22, which by rotation of the turntable are adapted to connect at their inner ends with a chamber 23 in one side of the journal 5$^a$. Said chamber extends somewhat more than half way around said journal, as best shown in Fig. 3, and is connected by a vertical passage 24 with a port 25 which is adapted to receive water under pressure through a pipe 26 connected with a centrifugal pump 27 or other suitable means for supplying water under pressure. In Fig. 1 the pump 27 is not shown connected with the pipe 26, because certain parts are broken away in said figure, but it will be understood that the delivery side of said pump is connected with said pipe. Instead of the pump 27, any other suitable means for furnishing water under pressure may be used. From the foregoing description it will be understood that as the turntable 18 rotates, the several passages 22 will be brought into connection with the chamber 23, and the connection of any given passage with said chamber will be maintained while the turntable makes approximately two-thirds of a complete rotation. After any passage 26, moves beyond the chamber 23, it will be closed at its inner end by the unchambered portion 28 of the journal 5$^a$, as shown in Fig. 3. So long therefore as any passage, 22, is in connection with the chamber 23, water under pressure will be supplied to it, but as the turntable rotates the water supply will in due time be cut off. In the arrangement shown, where four arms 20 are provided, three of such arms will ordinarily be receiving water at one time, while the fourth arm will be cut off.

Mounted upon the outer end of each arm 20 is a plate 29, preferably secured in place by screws 30, each of which plates is provided with an upwardly extending sleeve 31 upon which fits the tubular base 32 of a conical or funnel shaped head 33 having an axial passage 34 at the bottom thereof which registers with the bore of the sleeve 31. As shown the head is secured in place by a set screw 35. The upper or flaring portion of the head 33 is stepped, as shown at 36 in Fig. 1, to form a series of circular, horizontal seats of different diameters, which seats are adapted to support the outer collars or raceways 37 of antifriction bearings, as shown at the right in Fig. 1. Obviously by this arrangement the head 33 may be used in connection with bearings of a variety of diameters, and will support them in a horizontal position with the bore of the inner collar or raceway 38 of the bearing in axial alinement with the head 33, and with the balls 39 or other anti-friction means exposed above and below so that water rising through the head 33 may pass between the inner and outer raceways of the bearing around the anti-friction devices and be discharged at the top. As will presently be explained, the water is compelled to pass between the two raceways, as it cannot escape to any considerable extent either around the outside collar or through the inner one.

Each anti-friction bearing when in position on the head 33 is held fixedly thereon by a chuck-like device comprising a cone 40 carried at the lower end of a spindle 41 which is mounted to rotate about a vertical axis and move longitudinally toward and from the head 33. To this end each of the spindles 41 extends through the elongated hub 42 of a pulley 43, being connected therewith by a spline 44 which fits in a longitudinal groove in the spindle, as indicated in dotted lines in Fig. 1. The hub 42 is preferably mounted on anti-friction bearings 45, 45 at its lower and upper ends respectively, so that it rotates freely, said bearings being supported in one of the arms 46 of a casting 47 which is secured to a horizontal flange 48 at the upper end of the hub portion 19 of the turntable. Preferably said casting is held in place by screws 49, so that it may be detached when necessary. The several pulleys 43 are simultaneously rotated in the same direction by power derived from the motor 10, through the instrumentality of a belt 50 which runs around the pulley 16 on the armature shaft 15, around idler pulleys 51, 52 and around the several pulleys 43, as shown in Fig. 2. The armature shaft of the motor is arranged coaxial with the turntable 18, and consequently, although the motor support is stationary while the turntable rotates, the rotation of the turntable does not interfere with the driving of the several spindles 41 by the motor.

From the foregoing description, it will be understood that when an anti-friction bearing has been seated on the head 33, it may be held firmly on its seat by lowering the corresponding cone 40 into engagement with the inner sleeve 38 of such bearing, and that this will not only hold the outer sleeve 37 down firmly enough on its seat so that water cannot escape around it to any considerable extent, but also the cone will close the upper end of the inner sleeve 38 and prevent the escape of water through the latter sleeve. It will thus be seen that when the two holding or supporting members 33 and 40 are in engagement with the bearing a substantially closed chamber is defined between such supporting members, and that the only point of discharge from this chamber is through the space between the raceways of the bearing. Consequently, practically all the water that is forced up into the head 33 by the pump 27 will be forced through the bearing, that is to say, between the sleeves 37, 38 and around the anti-friction devices, escaping at the top of the bearing. While this occurs the inner sleeve 38 will be rotated rapidly by the rotation of the spindle 41, which is communicated to said sleeve frictionally by the cone 40. This rotation of the inner sleeve during the washing operation causes the balls or rollers to rotate rapidly, and ensures the liberation and removal from the bearing of any extraneous matter.

Attention is also directed to the fact that different types of bearings can be cleaned without necessitating any change in the apparatus or in the method employed. Assume, for example, that it is desired to cleanse tapered roller bearings of the type wherein the rollers revolve between inclined faces on the raceways. It will be understood that irrespective of how these bearings are placed on the heads 33, the lower raceway of the bearing will seat on the stepped surface 36, and the cone 40 will move down into engagement with the axial opening in the other raceway. Similarly, if it is desired to cleanse ball thrust bearings wherein both raceways extend transversely to the axis of the bearing, it will be understood that the outer edge of one of these raceways will seat on the stepped surface 36, and the cone 40 will engage in the axial opening of the other raceway. In either of these cases the water is free to pass through the space between the raceways for cleansing the bearing surfaces and anti-friction devices.

For moving the spindles 41 vertically to fix or release the bearings, as the case may be, each of said spindles is provided at its upper end with a grooved collar 53 fixedly secured thereto and engaged by a yoke 54 carried by one of the arms 55 of a bell-crank lever 56 pivotally mounted at 57 on an arm 58 that forms part of the casting 47. The other arm 59 of said bell-crank lever extends downward and carries a roller 60 which bears on the periphery of the cam 9, being held in engagement therewith by a spring 61, as shown in Fig. 1. Obviously by rocking the bell-crank lever 56 the collar 53 may be moved up or down, carrying with it the spindle 41. The cam 9 is so shaped as to move the spindles 41 down to carry their respective cones 40 into operative engagement with the underlying bearing just after the bearing has been put in place by the attendant, and before water is admitted to the corresponding head 33, and to move said spindles upward, to permit the removal of the bearing, after it has been washed and the water supply is cut off by the rotation of the turntable. This occurs just before the bearing is brought into position opposite the attendant.

The parts above described are enclosed in a housing 62, preferably circular in form and open at the top, although it may be closed at the top if desired. Said housing is provided with an opening 63 at one side thereof adapted to be closed by a sliding gate 64, which opening is arranged opposite the unchambered portion 28 of the journal portion 5ª, as indicated in Fig. 1. In addition to the housing 62, I prefer to provide an inner housing 65 which encloses the base plate 4 and the lower portion of the standard 5, and at the same time forms a chamber or tank 66 adapted to contain water. The wash water discharged through the bearings, as above described, falls into the tank 66, and if desired an intake pipe 67 leading to the pump 27 may connect with said tank, so that the water therein may be reused.

The operation of the apparatus has been in great measure already described, but it may be briefly recapitulated as follows: The operator standing in front of the opening 63 places a bearing on the head opposite such opening, and then swings the turntable 18 around to bring the next head into position to receive a bearing. This partial rotation of the turntable carries the roller 60 of the bell-crank lever 56 associated with the charged head 33 off the high part of the cam 9, thereby permitting its spring 61 to rock the arm 56 of such lever downward, thereby moving its cone 40 down into engagement with the inner sleeve 38 of the bearing just put in place. At the same time the water passage 22 leading to the head on which such bearing was placed is brought into connection with the chamber 23, so that water under pressure is discharged forcibly through such bearing in the manner described. This washing continues while the remaining heads of the turntable are being charged with bearings, after which, and shortly before the bearing referred to is brought back opposite the opening 63, the water supplied to it is cut off by the action of the cam 9, and the cone 40 holding it in place is lifted so that the bearing can be removed.

Obviously the machine may be provided with as many heads 23 as desired, four being shown in the machine illustrated merely to exemplify the principle of operation. I wish it to be understood, also, that my invention is not limited to mounting the turntable so that it rotates about a vertical axis, or to providing for the automatic control of the water supply, and the automatic actuation of the bearing holding devices, since, generically considered, my invention includes broadly any suitable mechanism for supporting the bearing and rotating the anti-friction devices thereof, meanwhile forcing water or other cleansing fluid therethrough. While I prefer to use water, the cleansing might be done by forcing a blast of air or some suitable liquid other than water through the bearing. The claims hereinafter made are therefore to be construed generically, except in so far as they are directed to specific features of the construction shown and described.

What I claim as my invention and desire to secure by Letters Patent, is:—

1. An apparatus for cleansing anti-friction bearings, comprising supporting means on which an anti-friction bearing can be readily placed and removed, means for rotating the anti-friction devices of the bearing, and means for forcing fluid under pressure between the raceways of the bearing.

2. An apparatus for cleansing anti-friction bearings, comprising means for supporting one of the raceways of an anti-friction bearing, means for rotating the other raceway thereof, both of said means permitting ready substitution of bearings and means for forcing a fluid under pressure between said raceways.

3. An apparatus for cleansing anti-friction bearings, comprising means for supporting the outer raceway of an anti-friction bearing, means for rotating and closing the passage through the inner raceway thereof, one of said means being readily separable from the other to permit convenient interchanging of bearings, and means for forcing a fluid under pressure between said raceways.

4. An apparatus for cleansing anti-friction bearings, comprising a tubular head adapted to receive and support one of the raceways of an anti-friction bearing, a cone movable toward and from said head into or out of engagement with the other raceway thereof, and means for forcing fluid under pressure between said raceways.

5. An apparatus for cleansing anti-friction bearings, comprising a tubular head adapted to receive and support the outer raceway of an anti-friction bearing, a cone movable toward and from said head into or out of engagement with the inner raceway, means for forcing fluid under pressure between said raceways, and means for rotating said cone.

6. An apparatus for cleansing anti-friction bearings, comprising a head adapted to support one of the raceways of an anti-friction bearing, a spindle movable toward and from said head coaxially therewith, a cone carried by said spindle and adapted to engage the other raceway of the bearing, and means for forcing fluid under pressure between said raceways.

7. An apparatus for cleansing anti-friction bearings, comprising a head adapted to support the outer raceway of an anti-friction bearing, a spindle movable toward and from said head coaxially therewith, a cone carried by said spindle and adapted to engage the inner raceway of the bearing, means for forcing fluid under pressure between said raceways, and means for rotating said cone.

8. An apparatus for cleansing anti-friction bearings, comprising a funnel shaped head having a series of seats of different diameters adapted to support the outer raceway of an anti-friction bearing, a spindle movable toward and from said head coaxially therewith, a cone carried by said spindle and adapted to engage the inner raceway of the bearing, and means for forcing fluid under pressure between said raceways.

9. An apparatus for cleansing anti-friction bearings, comprising a funnel shaped head having a series of seats of different diameters adapted to support one of the raceways of an anti-friction bearing, a spindle movable toward and from said head coaxially therewith, a cone carried by said spindle and adapted to engage the other raceway of the bearing, means for forcing fluid under pressure between said raceways, and means for rotating said cone.

10. An apparatus for cleansing anti-friction bearings, comprising a turntable, means carried thereby for supporting an anti-friction bearing and for directing a liquid discharge between the raceways thereof, and means operated by the rotation of the turntable for supplying liquid under pressure to the bearing and cutting off the supply thereto.

11. An apparatus for cleansing anti-friction bearings, comprising a standard, a turntable supported by and rotating about said standard, a head mounted on said turntable and adapted to support an anti-friction bearing, a cone movable toward and from said head and cooperating therewith to hold the bearing in position, means for forcing water under pressure through the bearing, and a motor mounted coaxially with said turntable and operatively connected with said cone for rotating the same.

12. An apparatus for cleansing anti-friction bearings of the type described comprising means for temporarily engaging the outer raceway of an anti-friction bearing, said means defining part of a fluid passageway communicating with said bearing, readily releasable means for closing the axial opening through the inner raceway, and fluid circulating means having connection with said passageway for forcing cleansing fluid through said bearing between the raceways thereof.

13. An apparatus for cleansing anti-friction bearings comprising holding means on which bearings of different sizes can be successively placed and removed in the cleansing thereof, means for causing relative rotation between the raceways of the bearing while the latter is supported on said holding means, and means for forcing a cleansing fluid under pressure between the raceways of the bearing.

14. An apparatus for cleansing anti-friction bearings prior to their installation comprising a pair of readily separable holding members adapted to receive bearings of different sizes therebetween, said holding members permitting the rapid placing and removal of successive bearings in the cleansing thereof, means for rotating one of said members to rotate one of the raceways of the bearing relatively to the other, and means for forcing a cleansing fluid under pressure between the raceways of the bearing.

15. An apparatus for cleansing anti-friction bearings prior to their installation comprising two readily separable holding members adapted to engage opposite raceways of the bearing for defining a substantially closed chamber between said members, with which the space between said raceways communicates, means for rotating one of said members for rotating one of said raceways, and means for forcing cleansing fluid under pressure into said chamber for discharging through the space between said raceways.

GEORGE P. ANSTISS.